(12) United States Patent  
He et al.

(10) Patent No.: US 8,027,955 B2  
(45) Date of Patent: Sep. 27, 2011

(54) DATABASE MANAGEMENT USING A FILE TO ACCUMULATE CHANGES

(75) Inventors: Gang He, Woodinville, WA (US); Srikumar Rangarajan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 11/725,364

(22) Filed: Mar. 19, 2007

(65) Prior Publication Data

US 2008/0235296 A1    Sep. 25, 2008

(51) Int. Cl.
*G06F 7/00* (2006.01)

(52) U.S. Cl. ........ 707/639; 707/618; 707/624; 707/625; 707/638; 707/649

(58) Field of Classification Search .................. 707/202, 707/618, 624, 625, 637, 638, 639, 649
See application file for complete search history.

(56) References Cited

U.S. PATENT DOCUMENTS

| | | |
|---|---|---|
| 4,858,146 A | 8/1989 | Shebini |
| 5,625,815 A | 4/1997 | Maier et al. |
| 5,745,753 A | 4/1998 | Mosher, Jr. |
| 6,411,964 B1 | 6/2002 | Iyer et al. |
| 6,584,477 B1 | 6/2003 | Mosher, Jr. |
| 6,591,269 B1 | 7/2003 | Ponnekanti |
| 6,965,899 B1 | 11/2005 | Subramaniam et al. |
| 6,980,988 B1 * | 12/2005 | Demers et al. ................... 707/8 |
| 7,143,123 B2 | 11/2006 | Tom et al. |
| 2005/0125430 A1 * | 6/2005 | Souder et al. ................. 707/100 |
| 2005/0165713 A1 | 7/2005 | Lafforet |
| 2006/0010157 A1 | 1/2006 | Dumitrascu et al. |

OTHER PUBLICATIONS

Data Concurrency and Consistency, Oracle Database Concepts, 10g Release 2 (10.2), Jan. 31, 2007, 28 pages.
Guidelines for Performing Online Index Operations, Microsoft Corporation, Apr. 14, 2006, 4 pages.
Halilovic, "New features in IBM Informix Dynamic Server", Version 10.0, Mar. 3, 2005, 11 pages.
Oracle8i and Oracle9i Data Reorganization and Feature Comparisons, An Oracle White Paper, Mar. 2002, 13 pages.

* cited by examiner

*Primary Examiner* — Etienne LeRoux
*Assistant Examiner* — Cindy Nguyen

(57) ABSTRACT

Database management is described. A source data structure is copied to create a new data structure. Changes to the source data structure that occur during and after creation of the new data structure are accumulated in a file before they are added to the new data structure. Changes included in the file are subsequently applied to the second data structure.

14 Claims, 4 Drawing Sheets

DATABASE MANAGEMENT USING A FILE TO ACCUMULATE CHANGES

BACKGROUND

Contemporary databases, such as databases associated with enterprise applications, can include a tremendous number of entries (e.g., rows). These databases may be frequently updated, growing even larger in the process. Updating these databases and maintaining the ability to retrieve information from them can be challenging. In computer science, a data structure such as an "index" or a "heap" is used to store database entries. The index/heap may need to be recreated if it is altered frequently as a result of Data Definition Language operations, for example.

One conventional approach for altering an index/heap may be referred to as a catch-up approach. In such an approach, a copy of the database index/heap is made at a first point in time—a snapshot of the original, or source, index/heap is captured—and a new index/heap is recreated using the snapshot offline. In the meantime, changes continue to be made to the source version until, at a later point in time, those new changes are applied to the offline version. This process is repeated until, it is hoped, a point in time can be reached in which the number of changes since the last update of the offline version is small. At that point, the source version is "frozen" for a relatively short period of time. That is, during the period of time needed to apply the last (small) set of changes to the offline index/heap, the source cannot be changed. In this manner, the offline version is able to catch up with the source version.

The approach just described can be problematic if the number of changes does not get small enough for the source version to be frozen, preventing the offline version from catching up with the source version. To address this, a database administrator may choose to take the source version offline anyway, for a period of time that is long enough to apply the last (most recent) set of changes to the offline version. However, if the number of changes to be applied is large rather than small, then the source version may be frozen for a relatively long period of time. Thus, this approach carries a price of inconveniencing the customer served by the database because, while the source version is frozen, the enterprise applications that feed changes to the source may have to be halted. In a similar vein, a database administrator may choose to temporarily slow down those applications, to create a situation in which only a small number of changes are generated so that the source need be frozen for only a relatively short period of time. However, this too comes at a price of inconveniencing the customer served by the database.

In summary, conventional approaches for database management have problems because they may generate changes faster than the changes can be applied. Conventional solutions to these problems have their own problems. A new solution to these problems would therefore be of value.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Management of database(s) is described. A source data structure is copied to create a new data structure. Changes to the source data structure that occur during and after creation of the new data structure are accumulated in a file (referred to as a "side file" that can take many forms), before the changes are added to the new data structure. Changes included in the file are subsequently applied to the second data structure.

BRIEF DESCRIPTION OF THE DRAWINGS

The accompanying drawings, which are incorporated in and form a part of this specification, illustrate embodiments and, together with the description, serve to explain the principles of the embodiments.

DETAILED DESCRIPTION

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "copying," "producing," "storing," "accumulating," "adding," "applying," "identifying," "determining," "consolidating," "waiting," "including," "executing," "maintaining," "updating," "creating," "implementing," "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Figure 1:
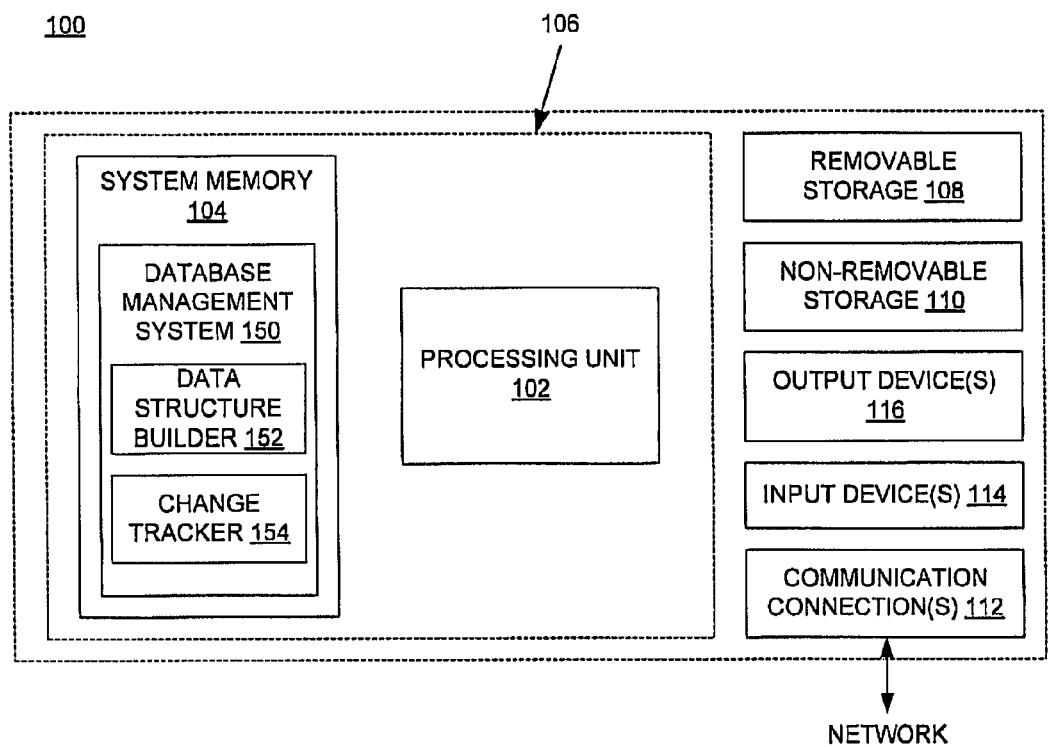
FIG. 1 is a block diagram of an example of a computer system upon which embodiments of a database management system may be implemented.

FIG. 1 shows a block diagram of one embodiment of an exemplary computer system 100 upon which embodiments described herein may be implemented. In its most basic configuration, system 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. System 100 may also have additional features/functionality. For example, system 100 may also include additional storage (removable and/or non-removable) including, but not limited to, magnetic or optical disks or tape. Such additional storage is illustrated in FIG. 1 by removable storage 108 and non-removable storage 110. System 100 may also contain communications connection(s) 112 that allow the device to communicate with other devices.

Generally speaking, system 100 includes at least some form of computer-usable media. Computer-usable media can be any available media that can be accessed by system 100. By way of example, and not limitation, computer-usable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can accessed by system 100. Any such computer storage media may be part of system 100. Memory 104, removable storage 108 and non-removable storage 110 are all examples of computer storage media.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Communications connection(s) 112 is an example of communication media.

System 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

System 100 may operate in a networked environment using logical connections to one or more remote computers, which may be a personal compute (PC), a server, a router, a network PC, a peer device or other common network node, and which may include many or all of the elements described above relative to the system 100. The logical connections may include a local area network (LAN) and a wide area network (WAN), but may also include other networks. Such networking environments are commonplace in offices, enterprise-wide computer networks, intranets and the Internet. When used in a networking environment, the system 100 can be connected to the network through communication connection(s) 112.

In the example of FIG. 1, memory 104 includes computer-readable instructions, data structures, program modules and the like associated with a database management system 150. However, database management system 150 may instead reside in any one of the computer storage media used by system 100, or may be distributed over some combination of the computer storage media.

In overview, database management system 150 is a database platform or a portion thereof. In one embodiment, database management system 150 is a relational database management system (RDBMS). By way of example, and not limitation, an example of an RDBMS is the Microsoft® SQL (Structured Query Language) Server™. In the present embodiment, database management system 150 embodies what are referred to herein as a data structure builder 152 and a change tracker 154. Data structure builder 152 may be implemented as a set of threads that implement a number of DDL (Data Definition Language) operations, and change tracker 154 may be implemented as a set of threads that implement a number of concurrent DML (Data Manipulation Language) activities.

The data structure builder 152 and change tracker 154 are illustrated as separate entities for purposes of discussion, although in practice they may or may not be implemented as such. In other words, the functions performed by builder 152 and tracker 154 can be performed (perhaps with other functions) using a database management system configured differently than that illustrated in FIG. 1. These functions are described further in conjunction with FIGS. 2 through 5.

Figure 2:
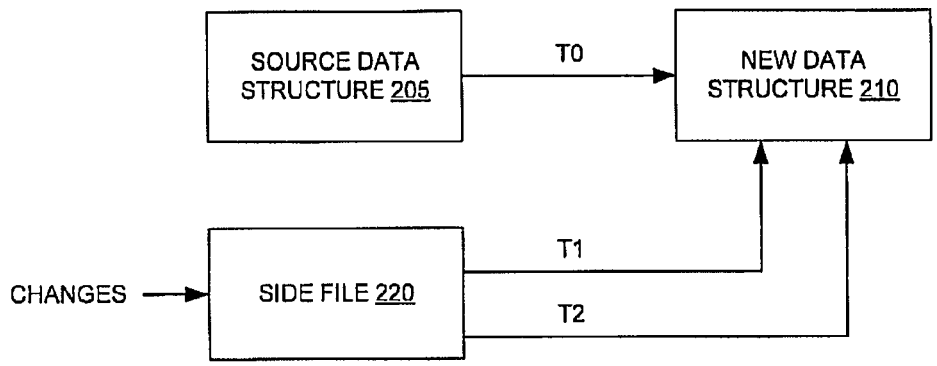
FIG. 2 is a block diagram showing information flow between elements of a database management system in one embodiment.

FIG. 2 shows certain logical elements created and managed by database management system 150, and the flow of information between those elements, according to one embodiment. In the example of FIG. 2, with reference also to FIG. 1, data structure builder 152 builds a new, offline data structure 210 at time T0. In essence, new data structure 210 (which may also be referred to herein as a second data structure) is recreated offline using a snapshot (copy) of source data structure 205 at time T0. In one embodiment, new data structure 210 is produced via a version scan of source data structure 205. The data structures 205 and 210 may be indexes or heaps, for example.

While new data structure 210 is being generated (built), changes that occur as the result of ongoing transactions may or may not be applied to source data structure 205. Also, because new data structure 210 is offline, changes are not applied at this point to the new data structure. Instead, change tracker 154 places changes that occur after time T0 into a side file 220. That is, changes that occur during and after the building of new data structure 210 are placed in side file 220 before they are applied to the new data structure. Side file 220 can take many forms such as, but not limited to, a flat file, a temporary database structure such as table, etc. Then, at time T1 after the new data structure 205 is built, some or all of the changes accumulated in side file 220 since time T0 are applied by builder 152 to new data structure 210. Each change applied by builder 152 is deleted from side file 220.

Furthermore, in the embodiment of FIG. 2, side file 220 is open to additional changes while the changes in it are being applied to new data structure 210 at time T1. Thus, at another time T2 after time T1, some or all of the changes accumulated in side file 220 since time T0 (and hence, since time T1 as well) are applied by builder 152 to new data structure 210. Again, each change applied by builder 152 is deleted from side file 220. The period of time during which the new data structure 210 is generated may be referred to herein as the build phase, and the period of time during which changes are applied from the side file 220 to the new data structure 210 may be referred to herein as the catch-up phase.

In one embodiment, the catch-up phase continues as described above until the number of changes remaining in side file 220 is small enough, at which point the builder 152 blocks upstream applications (e.g., enterprise applications involving ongoing DML activities) long enough for the remaining changes to be applied to new data structure 210. In one embodiment, this is accomplished by obtaining a "SCH_M" lock on the source data structure 205. The number of changes is small enough such that the amount of time needed to apply them is small, and so applications are blocked only for a period of time that is short enough to protect customers from being inconvenienced.

In another embodiment, various techniques can be implemented in the catch-up phase by change tracker 154 to address situations in which changes are generated faster than they can be applied to the new data structure 210. In essence, according to these other embodiments, change tracker 154 assists builder 152 in a way that prevents the side file 220 from increasing in size (measured by the number of changes stored in the side file) during the catch-up phase. The size of the side file 220 is thus bounded by the initial size of the file at the end of the build phase (at time T0) and can only decrease in size during the catch-up phase. Consequently, the side file 220 is guaranteed to eventually be small enough for the remaining changes to be applied to new data structure 210 without inconveniencing customers.

In one embodiment, each time a new change, or a number of new changes, is added to side file 220, the change tracker 154 applies the same number of changes (but not necessarily the new changes, as described further below) to the new data structure 210. In another embodiment, a new change or change cannot be added to side file 220 until the same number of changes are applied by change tracker 154 to new data structure 210—that is, a new change must wait until another entry already in the side file is 220 applied to the new data structure before the new change can be added to the side file.

In yet another embodiment, change tracker 154 makes an attempt to determine whether a new change is related to an existing entry in the side file 220. For example, an attempt is made to determine whether the new change and the existing entry have the same key. If the new change is not related to an existing entry in side file 220, then the new change can be added to the side file under the conditions described above. If the new change is related to an existing entry in side file 220, then the new change and the existing entry can be consolidated into one combined change, such that each key is associated with only one entry in side file 220. Alternatively, even if the new change is associated with an existing entry, it may be added to side file 220 as described above. As yet another alternative, the new change can be applied directly to the new data structure 220 by the change tracker 154 instead of being added to side file 220.

Side file 220 may be implemented as, for example, a side table, a version chain, or a transaction log. In a side table embodiment, change tracker 154 (FIG. 1) tracks changes in a temporary table, and builder 152 (FIG. 1) scans the table during the catch-up phase and applies the changes to new data structure 210. In one such embodiment, whenever tracker 154 makes a change to the source data structure 205, it also scans an entry (e.g., a row) in the side table and applies the scanned entry to the new data structure 210.

In a version chain embodiment, with reference to FIGS. 1 and 2, for each change made to the source data structure 205, the new and old images of an associated entry (e.g., a row) are stored and chained together. In the catch-up phase, builder 152 scans the version chain and applies changes to the new data structure 210. The old image in the chain is applied to the new data structure 210 using a delete operation, and the new image in the chain is applied using an insert operation. Thus, each change introduced by tracker 154 is translated into a pair of operations.

In a transaction log embodiment, a transaction log tracks and records all changes and thus can function in a manner analogous to a side table.

Figure 3:
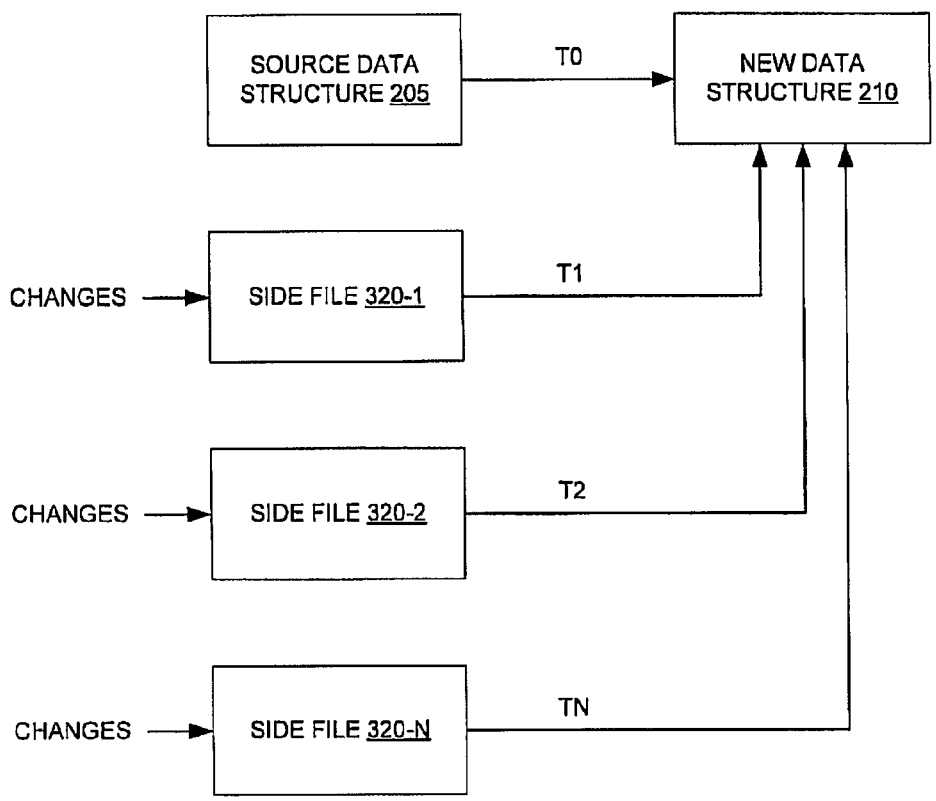
FIG. 3 is a block diagram showing information flow between elements of a database management system in another embodiment.

FIG. 3 shows certain logical elements created and managed by database management system 150 of FIG. 3, and the flow of information between those elements, according to another embodiment. In contrast to the example of FIG. 2, instead of utilizing a single side file, multiple side files 320-1, 320-2, . . . , 320-N are used. In the example of FIG. 3, with reference also to FIG. 1, data structure builder 152 builds a new, offline data structure 210 at time T0 as described previously herein.

While new data structure 210 is being generated (built), changes that occur as the result of ongoing transactions may or may not be applied to source data structure 205. Also, because new data structure 210 is offline, changes are not applied at this point to the new data structure. Instead, change tracker 154 places changes that occur after time T0 into a first side file 320-1. Then, at time T1 after the new data structure 205 is built, the changes accumulated in the first side file 320-1 since time T0 are applied by builder 152 to new data structure 210.

In the embodiment of FIG. 3, new changes after time T1 are accumulated in a second side file 320-2. Then, at time T2 after time T1, the changes accumulated in the second side file 320-2 since time T1 are applied to new data structure 210. This process continues until the number of changes in the last side file 320-N is small enough, at which point (time TN) the builder 152 blocks upstream applications long enough for the changes in side file 320-N to be applied to new data structure 210. The number of changes in side file 320-N is small enough such that the amount of time needed to apply them is small, and so applications are blocked only for a period of time that is short enough to protect customers from being inconvenienced. Each side file 320-1, 320-2, . . . , 320-N can be prevented from increasing in size (measured by the number of entries in the side file) using the techniques described above in conjunction with FIG. 2.

Figure 4:
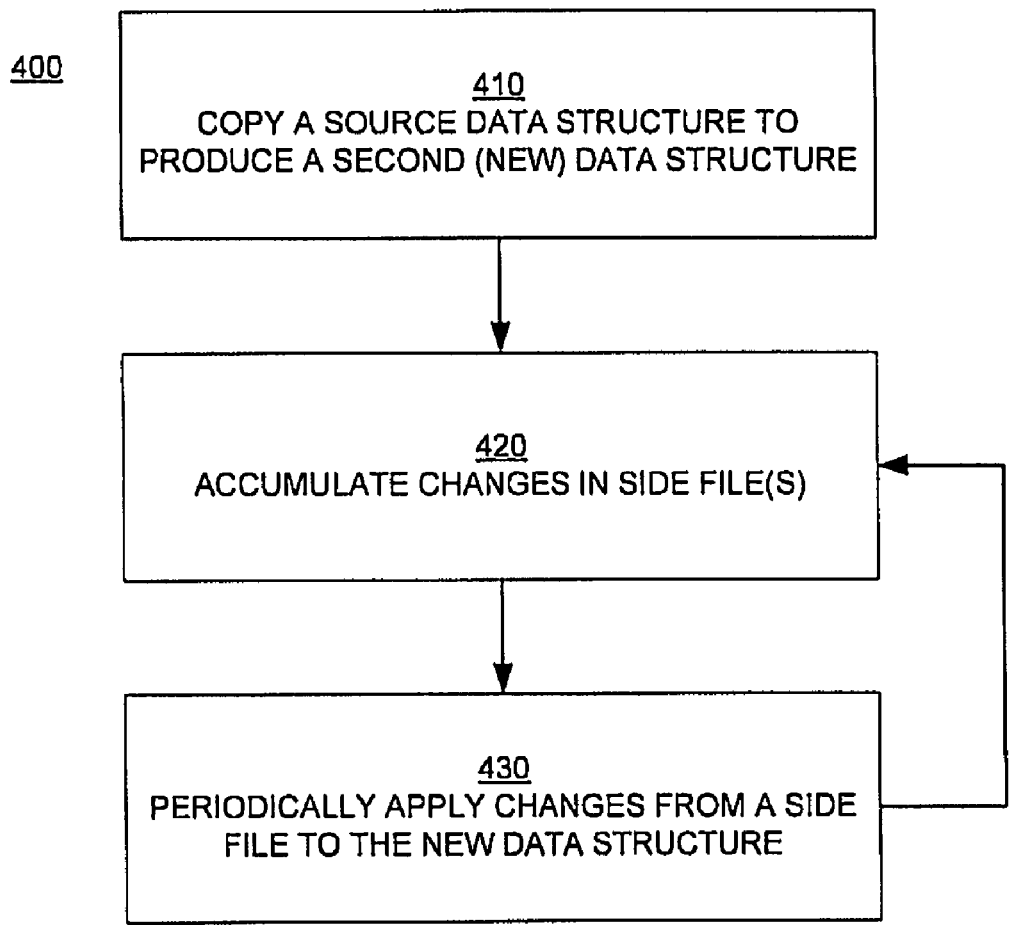
FIG. 4 is a flowchart of one embodiment of a method of database management.

FIG. 4 is a flowchart 400 of one embodiment of a method of database management. In one embodiment, flowchart 400 is implemented by database management system 150 of FIG. 1. In one such embodiment, blocks 410 and 430 are implemented by builder 152 (e.g., a DDL operator), and block 430 is implemented by either builder 152 or tracker 154 (e.g., a DML operator), as described in further detail below. In the example of FIG. 4, blocks 410 and 420 constitute the build phase and block 430 constitutes the catch-up phase previously referred to herein.

In block 410, with reference also to FIGS. 2 and 3, a source data structure (e.g., source data structure 205) is copied to produce a second data structure (e.g., new data structure 210). In one embodiment, the new data structure is built using a snapshot of the entire source data structure. In another embodiment, the new data structure is built using a number of builder threads that operate in parallel, with each builder thread building a disjoint range of the new data structure.

In block 420, which can occur in parallel with block 410, changes to the source data structure that occur during and after the build of the new data structure are accumulated in a file (e.g., side file 220 of FIG. 2, or one of the side files 320-1, 320-2, . . . , 320-N of FIG. 3) before they are added to the new data structure. Additional information is provided in conjunction with FIG. 5, below.

In block 430 of FIG. 4, with reference also to FIG. 1, at various points in time subsequent to completion of blocks 410 and 420, some or all of the changes included in the side file are applied to the new data structure. At various points in time, the builder 152 applies changes from the side file to the new data structure. In addition, between those various points in time, the tracker 154 applies changes to the new data structure as it also adds changes to the side file. Thus, the tracker 154 (e.g., the DML operator) assists the builder 152 (e.g., the DDL operator)—in essence, the builder 152 periodically applies a wholesale set of changes in the side file to the new data structure, while the tracker 154 incrementally applies changes to the new data structure as it adds changes to the side file.

More specifically, in one embodiment, when tracker 154 adds a number of changes to the side file, it also applies the same number of entries from the side file to the new data structure. Tracker 154 has several options for choosing which entries in the side file to apply to the new data structure. In one embodiment, a time-based criterion is used to select the entry to be applied; for example, the oldest entry may be applied. In another embodiment, an entry is randomly selected. In yet another embodiment, when a change is consolidated with an existing entry (as previously described herein), the resulting entry is selected and applied. As previously mentioned, there may be instances in which a change and an existing related entry are not consolidated in the side file, leading to the existence of multiple entries having the same key. In those instances, in an embodiment in which an entry is selected based on time or is randomly selected, the earliest of the entries with the same key is selected, because in general changes with the same key should be applied in their order of occurrence.

The functionality just described can be realized through an appropriate query plan written for tracker 154. In one embodiment, each data manipulation operation (e.g., each DML operation) is intercepted and tracked. A query plan associated specifically with the catch-up phase can be generated, cloned and stored in cache memory. During the catch-up phase, the data manipulation operation is again intercepted and the query plan in cache is retrieved and executed.

Builder 152 can apply changes using a single builder thread or using multiple builder threads operating in parallel. The degree of parallelism can be the same as that of block 410. To avoid contention, each builder thread scans a disjoint range in the side file and applies the changes within that range to a corresponding range in the new data structure.

The catch-up phase generally involves internal transactions that are periodically committed by builder 152 in order to prevent blocking of tracker 154. When builder 152 scans the side file, it can skip uncommitted changes because those changes will be scanned later.

Blocks 420 and 430 of flowchart 400 can be repeated until the number of changes in the side file 220 or 320-N is sufficiently small, as previously described herein. The remaining changes are applied, completing the new data structure.

Figure 5:
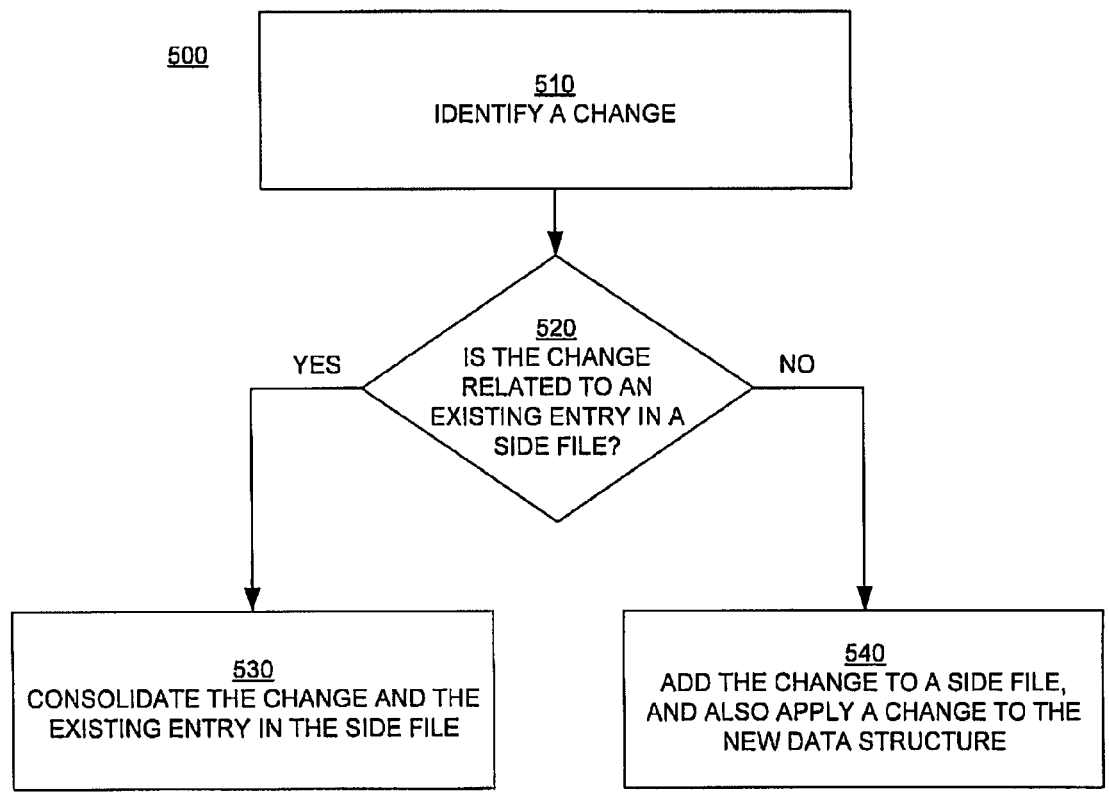
FIG. 5 is a flowchart of one embodiment of a method for limiting the size of elements of a database management system.

FIG. 5 is a flowchart 500 showing, according to one embodiment, the steps that can be taken to ensure that a side file (e.g., side file 220 of FIG. 2, or each one of the side files 320-1, 320-2, . . . , 320-N of FIG. 3) does not increase in size during the catch-up phase. The blocks below are described in the context of a single change, but the description can be applied to any number of changes.

In block 510 of FIG. 5, a new change is identified. In one embodiment, the change is a result of concurrent DML operations. In block 520, a determination is made whether the change is related to an existing entry in the side file. In one embodiment, a key associated with the change is compared to the keys associated with the entries in the side file, to determine if there is already an entry in the file with the same key. If the new change is not related to an existing entry, then flowchart 500 proceeds to block 540; otherwise, flowchart 500 proceeds to block 530.

In block 530, in one embodiment, the new change and the existing entry are consolidated as a single entry in the side file. Note that consolidation not only prevents the size of the side file from increasing, but can perhaps reduce the size of the side file. For example, the result of one transaction may cancel the result of an earlier transaction; accordingly, the new change may cancel out the existing entry, resulting in the removal of that entry from the side file.

In block 540, the new change is added to the data structure (e.g., a new row is created). As previously described herein, when the new change is added to the side file, an existing entry is applied to the new data structure. Alternatively, an existing entry is first applied to the new data structure, before a new change can be added to the side file.

Although specific steps are disclosed in flowcharts 400 and 500 of FIGS. 4 and 5, such steps are exemplary. That is, various other steps or variations of the steps recited in flowcharts 400 and 500 can be performed. The steps in flowcharts 400 and 500 may be performed in an order different than presented. Furthermore, the features of the various embodiments described by flowcharts 400 and 500 can be used alone or in combination with each other. In one embodiment, flowcharts 400 and 500 can be implemented by computer system 100 (FIG. 1) as computer-readable program instructions stored in a memory unit (e.g., memory 104 of FIG. 1) and executed by a processor (e.g., processor 102 of FIG. 1).

In summary, according to embodiments described herein, the catch-up phase is guaranteed to complete, regardless of the level of concurrent activities (e.g., concurrent DML activities), by accumulating changes to a database index/heap in a side file. In addition, the size of the side file, once created, is not allowed to increase and can only decrease in size (e.g., as measured by the number of its entries).

Moreover, in comparison to other conventional approaches, embodiments described herein perform faster. That is, not only is catch-up guaranteed, but the amount of time needed to build an index/heap is shown empirically to be reduced significantly.

In the foregoing specification, embodiments have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method of database management, said method comprising:
    copying a source data structure to produce a second data structure;

storing changes to said source data structure that occur during and subsequent to said copying, said changes accumulated in a first file before they are added to said second data structure;

at a first point in time subsequent to said copying, applying changes included in said first file to said second data structure; and subsequent to said copying, waiting for an entry already in said first file to be applied to said second data structure before including a new change in said first file;

wherein the number of entries in said first file is not increased subsequent to said copying.

2. The method of claim 1 further comprising, for each change added to said first file subsequent to said copying, applying an entry in said first file to said second data structure.

3. The method of claim 1 further comprising:

subsequent to said copying, identifying a new change to be included in said first file;

determining whether said new change is related to an entry in said first file; and if related, consolidating said new change and said entry into a single combined entry.

4. The method of claim 1 further comprising:

storing, in said first file, changes to said source data structure that occur during and subsequent to said applying at said first point in time; and at a second point in time, applying changes included in said first file subsequent to said first point in time to said second data structure.

5. The method of claim 1 further comprising:

storing, in a second file, changes to said source data structure that occur during and subsequent to said applying at said first point in time; and at a second point in time, applying changes included in said second file to said second data structure.

6. The method of claim 1 further comprising:

executing a first query plan during said storing; and executing a second query plan during said applying, said second query plan different from said first query plan.

7. A tangible computer-readable medium having computer-executable components for managing a database, said components comprising:

a data structure builder operable for copying a source data structure to provide a second data structure and for updating said second data structure; and a change tracker coupled to said builder, wherein said tracker is operable for storing changes to said source data structure that occur during and after creation of said second data structure, wherein said changes are accumulated in a first file other than said source data structure and other than said second data structure;

wherein changes included in said first file are applied to said second data structure at a first point in time after said creation of said second data structure;

wherein, subsequent to said copying, an entry already in said first file is applied to said second data structure before a new change can be included in said first file; and wherein the number of entries in said first file is established by the number of changes accumulated during said copying and is not increased subsequent to said copying.

8. The tangible computer-readable medium of claim 7 wherein, for each change added to said first file subsequent to said copying, an entry in said first file is applied to said second data structure.

9. The tangible computer-readable medium of claim 7 wherein, subsequent to said copying, a new change to be included in said first file is consolidated with an entry in said first file if said new change and said entry are related.

10. The tangible computer-readable medium of claim 7 wherein changes to said source data structure that occur during and subsequent to said applying at said first point in time are stored in a second file and applied to said second data structure at a second point in time.

11. A tangible computer-usable medium having computer-readable program code embodied therein for causing a computer system to perform a method of database management, said method comprising:

implementing a build phase in which a source data structure is copied to create a second data structure and in which changes to said source data structure that occur during said build phase are accumulated in a first file that is different from said source data structure and different from said second data structure;

following completion of said build phase, implementing a catch-up phase in which changes accumulated in said first file up to a first point in time are applied to said second data structure;

subsequent to said copying, identifying a new change to be included in said first file; and waiting for an entry already in said first file to be applied to said second data structure before including said new change in said first file;

wherein the number of entries in said first file is established by the number of changes accumulated during said copying and is not increased subsequent to said copying.

12. The tangible computer-usable medium of claim 11 wherein said method further comprises:

adding a number of changes to said first file subsequent to said copying; and applying an equal number of entries in said first file to said second data structure.

13. The tangible computer-usable medium of claim 11 wherein said method further comprises, subsequent to said copying, consolidating a new change to be included in said first file with an entry in said first file if said new change and said entry have the same key.

14. The tangible computer-usable medium of claim 11 wherein said method further comprises generating a query plan for use only during said catch-up phase.

* * * * *